United States Patent [19]

Bremer, Jr.

[11] 4,220,056
[45] Sep. 2, 1980

[54] TORSIONAL VIBRATION DAMPER

[75] Inventor: Robert C. Bremer, Jr., Brownsburg, Ind.

[73] Assignee: Wallace Murray Corporation, New York, N.Y.

[21] Appl. No.: 944,196

[22] Filed: Sep. 19, 1978

[51] Int. Cl.² ............................................. F16F 15/10
[52] U.S. Cl. .................................................. 74/574
[58] Field of Search .......................................... 74/574

[56] References Cited

U.S. PATENT DOCUMENTS

| 1,815,894 | 7/1931 | Baker | 74/574 |
| 1,916,309 | 7/1933 | Griswold | 74/574 |

FOREIGN PATENT DOCUMENTS

| 1240049 | 7/1959 | France | 74/574 |
| 1217506 | 12/1970 | United Kingdom | 74/574 |

Primary Examiner—Kenneth Dorner
Attorney, Agent, or Firm—Thomas J. Greer, Jr.

[57] ABSTRACT

A torsional vibration damper of the type having an inertia ring secured to a hub, the hub being coupled to the crankshaft of an internal combustion engine. Elastomer members are sandwiched between the hub and a two-piece inertia ring. The improvement of this invention includes a radially outwardly extending tongue, a portion of which is sandwiched by two elastomer members. The elastomer members are preformed so as to assume an L-shape in half-axial cross-section, the members being adhesively bonded to the hub and to the inertia ring.

2 Claims, 1 Drawing Figure

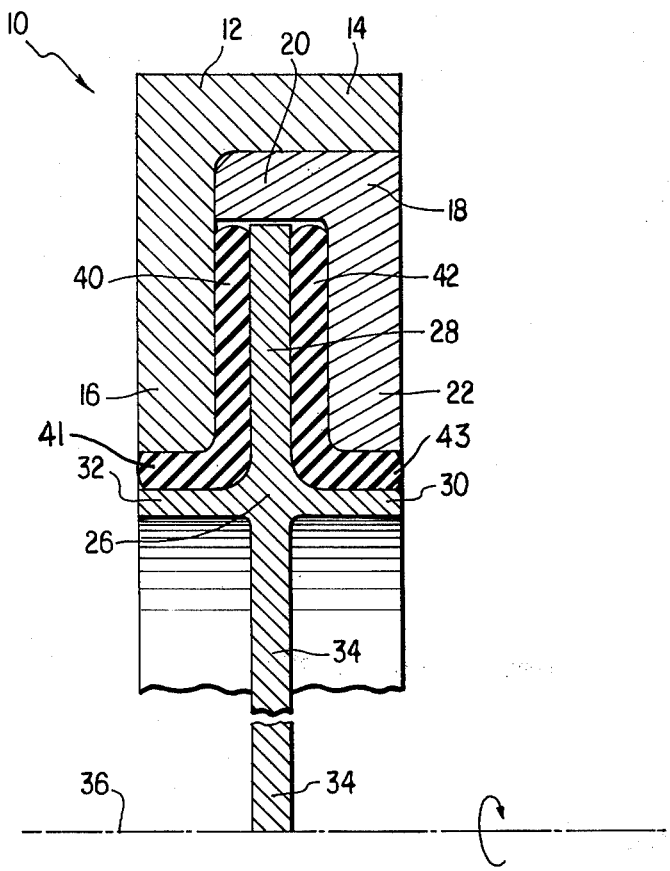

TORSIONAL VIBRATION DAMPER

This invention relates to torsional vibration dampers of the type having a hub secured to an outer inertia member by an elastomer annulus.

The invention exhibits particular utility to the damping of torsional vibrations in internal combustion engines. Such dampers are generally classified at present in Class 74, sub-class 574 in the United States Patent Office. Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly, where one of the resonant frequencies of the crankshaft coincides with the particular firing frequency of the engine or a particular harmonic of that frequency. According to present theory of elastomer vibration dampers, a portion of the torsional vibrational energy transmitted to the crankshaft by the action of the pistons is covered into heat in the elastomer. The elastomer may, accordingly, be considered as a drain or sump which continually receives a portion of the energy which causes torsional vibrations.

A common form of such a damping device includes an outer or inertia member in the form of a ring or annulus of some significant mass. The inner portion of this ring is attached to an elastomer annulus which, in turn, is secured to a hub or other element in turn attached to the rotating crankshaft of an engine. Both the hub and the inertia members may be of cast iron. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 rpm simultaneously executes angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

As an internal combustion engine is operated at various engine speeds, several vibrational frequencies appear on the crankshaft. In general, most automotive and diesel engines of present design and not utilizing a torsional vibration damper have one fairly high amplitude resonant frequency within the engine operating range of speeds. However, at any given engine speed, torsional vibrations from various orders of vibrations are present and can be significant.

For a given damper application, i.e., a damper for a specific engine, it is known in the art to use as much elastomer (volumewise) with as much shear area (interface area between metal elastomer) as possible to minimize shear stress. In practice, space limitations preclude simply expanding the width or the diameter of the damper to achieve these low values.

The practice of this invention facilitates the design of torsional vibration dampers having certain properties within given space limitations. The damper of this invention also exhibits high radial and axial stiffness. It is known that the spring rate of an elastomer damper increases with the fourth power of the radial distance (from the axis of damper rotation) of the elastomer. By the practice of this invention the configuration of the elastomer is such that the radially innermost portion of the elastomer material extends axially, thus placing a greater proportion of elastomer at a smaller radial distance from the axis of the damper rotation, to thereby yield a softer or lower spring rate.

Referring now to the drawing, the torsional vibration damper of this invention is illustrated in half-axial, longitudinal cross-section, showing the upper half only. The reader will understand that a full axial cross-section would be simply the mirror image of that shown, i.e., would extend below the axis of rotation indicated by the numeral 36.

The numeral 10 denotes generally a torsional vibration damper formed in accordance with this invention and includes a two-piece inertia ring, the radially outermost piece of which is denoted by the numeral 12. It includes an axially extending, radially outermost portion 14, and a radially extending side portion 16. The numeral 18 denotes the other piece of the two-piece inertia ring, piece 18 having an axially extending, radially outermost portion 20 and an axially extending side portion 22. The reader will observe that, in the half-axial cross-section illustrated, the inertia ring is of generally inverted U-shaped form in cross-section. The outermost piece 12 is of generally L-shape in half-axial cross-section, having an axially extending leg 14 and a radially extending leg 16. Similarly, the other piece 18 is also of generally L-shape, having an axially extending leg 20 and a radially extending leg 22.

The numeral 26 denotes a hub having a radially outwardly extending, integral tongue 28, a first axially extending flange 30, a second axially extending flange 32, and a radially inwardly extending web 34. As is conventional in this art, the radially innermost portion of web 34 is suitably connected to the crankshaft of an internal combustion engine, the damper thus rotating about axis 36.

The numeral 40 denotes a first elastomer member having a radially extending portion and an axially extending portion 41. The numeral 42 denotes a similar elastomer member having a radially extending portion and an axially extending portion 43. Elastomer elements 40 and 42 are generally L-shape in the illustrated cross-section. The members 40 and 42 are preformed and may be conventionally adhesively bonded to the complementary surfaces on the hub and on the inertia ring which they contact.

In assembly, the elastomer members 40 and 42 are placed on hub 26 and, as noted above, preferably bonded thereto. Next, portion 12 of the two-portion inertia ring is placed in the indicated position, portion 14 being stretched radially outwardly as for instance by heating so as to permit the insertion of portion 18. The radial stretching is now released as by cooling, with the result that a class FN 5 interference fit is formed at the junction 19 between the two-axially extending portions of the inertia ring elements. Depending upon the exact mode of assembly (well known in this art) the elastomer members may be compressed at both their radial and axial portions, or they may remain uncompressed.

The mode of operation of the torsional vibration damper described is similar to that of other elastomer-viscous dampers. Namely, as the crankshaft of the internal combustion engine rotates about axis 36, it carries flange 34 therewith and thus the hub undergoes the same torsional vibrations. Because of the elastic connection between the hub and the inertia ring, there will be a phase lag, phase difference, or angular lag between the oscillations of the hub and the corresponding oscillations transmitted to the inertia ring by the elastomer members 40 and 42. This phase difference or phase lag, as noted above, gives rise to the conversion of energy from the form of mechanical energy to the form of heat energy.

The reader will observe that the tongue 28 axially locks the inertia ring relative to the hub and thus precludes relative axial excursions between these elements. It will further be observed that elastomer elements 40 and 42 need not be of the same thickness, nor need they be of the same properties. Thus, one may be selected for its high resistance to torque and the other for its high conversion of rotary oscillations into heat. The inertia and hub members are formed of metal, although non-metal material such as a reinforced plastic may be employed for the hub. The axially extending flanges 30, 32 sandwich elastomer portions 43, 41, respectively, with the radially innermost ends of ring pieces 16 and 22. Forces from the hub 26 are transmitted to the elastomer elements along the surfaces of tongue 28 and flanges 30, 32.

What is claimed:

1. A torsional vibration damper including,
   (a) an annular inertia ring formed of two annular pieces, each piece being of generally L-shape in half-axial cross-section defining axially and radially extending legs, the axially extending legs of said L-shape pieces having a common surface of junction, one of said axially extending legs being positioned radially inwardly of the other, the radially extending legs of the said L-shape pieces, together with the said axially extending legs defining a generally U-shape in half-axial cross-section,
   (b) an annular hub,
   (c) a radially outwardly extending tongue carried by the hub and integral therewith,
   (d) a pair of annular elastomer members each having a radially extending portion, which portions sandwich the tongue, said elastomer members also each having an axially extending portion, said elastomer members being generally L-shape in half-axial cross-section,
   (e) the radially extending portions of the L-shape pieces sandwiching the tongue and the radially extending portions of the elastomer members,
   (f) said hub also having axially extending flanges radially inwardly of said inertia ring, said hub flanges and said inertia ring sandwiching the said axially extending elastomer portions,
   (g) whereby the elastomer members cooperate with the inertia ring and hub to damp torsional vibrations of the hub.
2. The damper of claim 1 wherein the said common surface of junction is an interference fit.

* * * * *